(12) United States Patent
Dierks

(10) Patent No.: US 6,742,542 B1
(45) Date of Patent: Jun. 1, 2004

(54) MULTIPORT VALVE

(75) Inventor: Gerold Dierks, Treuchtlingen (DE)

(73) Assignee: Alfmeier Prazision AG Baugruppen, Treuchtlingen (DE)

( * ) Notice: Subject to any disclaimer, the term of this patent is extended or adjusted under 35 U.S.C. 154(b) by 0 days.

(21) Appl. No.: 09/663,211

(22) Filed: Sep. 15, 2000

(30) Foreign Application Priority Data

Sep. 16, 1999 (DE) .......................................... 199 44 430
Mar. 28, 2000 (DE) .......................................... 100 15 080

(51) Int. Cl.⁷ .......................... F15B 13/04; F16K 11/14
(52) U.S. Cl. .................... 137/636; 137/596; 137/636.1; 137/627.5; 280/736; 280/742
(58) Field of Search ............................. 137/636, 636.1, 137/636.2, 607, 596, 596.1, 596.2, 637, 627.5; 251/331, 335.2; 280/736, 742

(56) References Cited

U.S. PATENT DOCUMENTS

| 763,889 A | * | 6/1904 | Hennebohle | 137/596 |
|---|---|---|---|---|
| 817,773 A | * | 4/1906 | Hennebohle | 137/596 |
| 1,075,357 A | * | 10/1913 | Kirkley | 137/596 |
| 2,497,558 A | * | 2/1950 | Reeves | 137/626.2 |
| 2,591,293 A | * | 4/1952 | Reeves | 137/636.1 |
| 3,036,596 A | * | 5/1962 | Alfieri | 137/636.1 |
| 3,207,472 A | * | 9/1965 | Seltsam | 251/331 |
| 3,301,525 A | * | 1/1967 | Chernak et al. | 251/331 |
| 3,904,174 A | * | 9/1975 | Giese | 251/331 |
| 3,991,788 A | * | 11/1976 | Kull | 251/331 |
| 4,006,753 A | * | 2/1977 | Ingram et al. | 137/607 |
| 4,203,464 A | * | 5/1980 | Farrell et al. | 137/636.1 |
| 4,357,957 A | * | 11/1982 | Bisonaya et al. | 137/636.1 |
| 5,305,782 A | * | 4/1994 | Kipling et al. | 137/596 |
| 5,682,922 A | * | 11/1997 | Galazin et al. | 137/636.1 |

FOREIGN PATENT DOCUMENTS

| DE | 2123914 | * | 11/1972 | 137/636.1 |
|---|---|---|---|---|
| DE | 3503357 | | 8/1986 | |

* cited by examiner

Primary Examiner—George L. Walton
(74) Attorney, Agent, or Firm—Dority & Manning, P.A.

(57) ABSTRACT

A multiport valve having a valve body and a controllable opening in a surface is provided. An activation element is also disclosed which is controllably attached to a sealing element in communication with the surface. An elastomer membrane is provided about the activation element and in contact with the sealing element. The activation element selectively elevates the sealing element from a valve seat. Additional multiport valve embodiments are also disclosed including a toggle to regulate multiple valve seats.

21 Claims, 8 Drawing Sheets

MULTIPORT VALVE

FIELD OF THE INVENTION

The invention concerns a multiport valve, which, for instance, can serve for pneumatic control, intended generally for the regulation of air bags at vehicle seats.

BACKGROUND OF THE INVENTION

In the usual multiport valve, a sealing element customarily is incorporated in a valve chamber in which a plurality of connecting passages communicate with openings. DE 35 03 357 discloses a multiport valve, which exhibits an operational duct that can be connected to one pneumatically functioning device and also to two pressure passages connectable to respectively different pressure sources. The connecting passages open respectively with one opening into a valve chamber, which is encapsulated by an elastic membrane and by a housing component. On the inside of the membrane are provided two sealing surfaces, that can be pressed against the opening of the respective pressure line in order to close this access.

The membrane area, which is found between the sealing surfaces, abuts itself against a pin placed in the valve housing to serve as a toggle bearing. The toggle movement of the membrane area, which possesses the sealing surfaces, is activated by a rod. This rod is seated in a recess on the membrane side in which its longitudinal axis aligns with the central, longitudinal axis of the toggle bearing.

The disadvantage of this known valve is that the activation rod must be moved in a direction specified by the position of the toggle bearing and the valve seat. Accordingly, the valve is installed in an apparatus, for instance in a control unit, in which the various possibilities for the spatial orientation of the valve are limited. This is especially problematic when a plurality of individual valves must be combined into a greater valve arrangement.

A further disadvantage of this known multiport valve is that the pin placed in the toggle bearing in the valve chamber, with its additional space requirement, makes necessary a larger valve housing and especially requires a larger area for the membrane.

OBJECTIVES AND SUMMARY OF THE INVENTION

Thus, the objective of the invention is to propose a multiport valve to overcome the stated disadvantages.

This objective is achieved by a multiport valve possessing the features of the invention. Accordingly, there are two connection passages communicating with one opening in the valve chamber, namely a first and a second connection passage are present. Only the opening of the first connection passage is controllable with the help of a sealing element. The sealing element, when in its inactive state, lies on the peripheral rim which forms the valve seat of the controllable opening. At the same time, the sealing element closes the complementary first opening. The sealing element is either directly or indirectly bound in such a manner with an activation means that the sealing element can be tilted away from the valve seat. During tilting, the valve seat also acts as the bearing for the toggle action.

In the case of a circularly shaped valve seat, the direction of the tilting motion of the sealing element is variable. Therefore, contrary to the requirement of DE 35 03 357, the installation orientation of the valve is not limited by a pre-determined direction of activation.

The valve seat of the controllable opening also serves as a toggle bearing, so a separate toggle bearing may also be dispensed with. As a result, a smaller valve housing and especially a smaller membrane are required, which relates favorably on the clearance space required for the installation of a valve. Another advantage is obviously found in the valve production costs. Manufacturing of the proposed valve of the invention is simplified as well.

In the case of the known valve, care must be taken as to the exact mutual positioning of the two valve seats on the membrane underside, as well as the placement of the toggle bearing. In contrast, in the case of the proposed valve, only the position of the sealing element and the controllable opening of the first connection entry must be aligned with one another.

On the other hand, the opening of the second passage can open at an optional location in the valve chamber. The same membrane for the valve body can be used with a different arrangement of the opening of the second connection passage. Particularly advantageous is a situation in which the membrane is circular in shape as seen from the top and the sealing element is placed in the center of the membrane. During assembly then, the rotational position of the membrane is not critical.

In another advantageous embodiment, the membrane and the sealing element are of one-piece construction. This step substantially simplifies the manufacture. The activation element is preferably an activation rod, which has one end embedded in a radial and axial shape-fit in a recess made in the sealing element on the membrane's outer side. With an activation rod so affixed, then the sealing element can be either lifted up; i.e., elevated from the sealing seat, or by a deflection of the activation rod, be tilted away from the seat.

Besides the simplicity of assembly, the activation rod is particularly valuable in that the membrane need not be penetratively attached to the rod, which would otherwise exhibit sealing problems. The valve chamber space is hermetically sealed, especially when the closure element is of one-piece with the membrane.

The effectiveness of the sealing function due to the coaction of the sealing element and opening of the first connection passage is improved by a protruding valve seat rising from the surface and, ring-like, circumscribing the opening. Advantageously, the surface and the edge area which surrounds the opening is a smooth plane.

In a favorable embodiment, the sealing element is spring loaded in the closure direction in which the activation rod is enclosed within a helical spring. The spring abuts itself on one end against a housing wall and on the other end against a flange protruding radially from the activation rod. In another advantageous embodiment, an overlaying toggle top is provided, which, in the directionally pressed condition, deflects the activation rod.

A multiple port valve arrangement with at least three connection passages is possible if a plurality of the above described valves are preferably combined together in one housing. In such an arrangement, only one valve body with a common surface is provided. The connection passages communicate, respectively, with one or more openings in the surface.

The membranes of the individual valves for such a combined valve arrangement are advantageously bound together by the formation of a one-piece, general membrane. The various possibilities of a multiport valve can be increased in which the valve chambers of two neighboring membranes are bound together over one passage. The passage is admitted on the underside which lies on the common surface of the membrane sealing disk. In this way, for example, the valve chambers of two individual valves can be interconnected with a common communication passage. In a preferred valve arrangement, a circular shaped toggle top is provided, which has its bearing in a centrally located, hemispherical pin seated in a corresponding socket integral with the housing top. With this arrangement, a plurality of lever arms radiate somewhat at right angles, each coacting to deflect a respective activation rod.

BRIEF DESCRIPTION OF THE DRAWINGS

The invention is now described and explained in greater detail with the aid of the following drawings. There is shown in.

DETAILED DESCRIPTION OF THE DRAWINGS

Detailed reference will now be made to the drawings in which examples embodying the present invention are shown. The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

Figure 1:
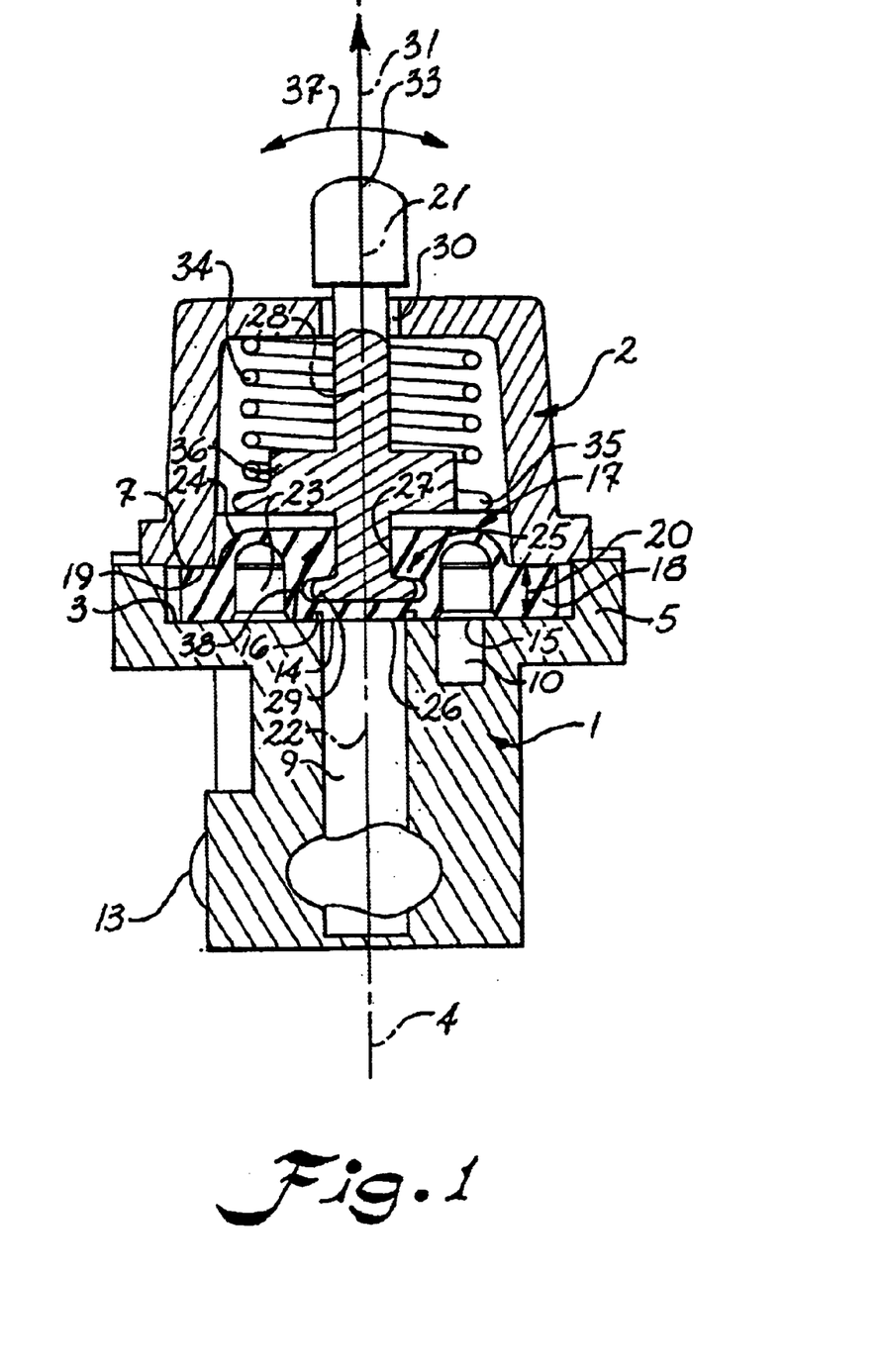
FIG. 1 a longitudinal section through a multiport valve with two connection passages and two flow diversion positions, FIG. 2 a multiport valve arrangement with three connection passages and four flow diversion positions in a perspective view, FIG. 3 a top view of the valve body in accord with FIG. 2, FIG. 4 a sectional view along the lines IV—IV in FIGS. 2 and 3, FIG. 5 a longitudinal sectional view along the lines V—V in FIGS. 2 and 3, FIG. 6 a cross-sectional view along the line VI—VI in FIG. 5, FIG. 7 the valve arrangement of FIG. 4, wherein, however, the toggle is shown as activated, FIG. 8 the top view of an entire membrane, FIG. 9 a schematic valve flow diagram illustrating the connection possibilities of the valve arrangements shown in FIGS. 2 to 7, and FIG. 10 a multiport valve in a view according to FIG. 7, modified with an additional electrical switching connection.

FIG. 1 shows a 2/2 valve; i.e., a valve with two connection fittings and two flow diversions. This valve possesses one valve body 1 and a housing top 2. On the valve body 1 is placed a plane surface 3, which extends at right angles to the central, longitudinal axis 4 of the valve. The surface 3 is peripherally surrounded by an apron 5 which extends parallel to the central, longitudinal axis 4. Within the valve body 1 are provided two connection passages, namely a first connection passage 9 and a second connection passage 10, which lead outward from the valve body 1 through the connection fitting 13. The connection passages 9, 10, terminate in the controllable opening 14 and opening 15 in the surface 3 of the valve body 1. One of the two openings, the controllable opening 14, is encircled by a protruding, annular-shaped valve seat 16 rising out of the surface 3.

Between the valve body 1 and the housing top 2 is placed a membrane 17. This membrane 17 is designed to be circular and lies with a ring-shaped, closed, encircling rim gasket or sealing disk 18 on the surface 3. The sealing disk 18 lies with its upper side 19 on the facing 7 of the housing top 2. The axial distance apart between the facing 7 and the surface 3 is less than the height 20 of the sealing disk 18 in the unassembled condition, so that this is under pressure, when assembled against the surface 3. The membrane 17 and the surface 3 enclose a valve chamber 23 between them. The sealing disk 18 goes through a transition from a thin walled area into a central thickened zone forming a sealing element 25. Sealing element 25 is a somewhat cylindrically shaped protrusion on the underside of the membrane 17, which extends itself into the valve chamber and lies upon the sealing surface 26 on the valve seat 16, whereby the sealing element 25 closes the controllable opening 14.

Downward from the upper side of the membrane 17, there extends a blind or cul-de-sac shaped recess 27 in the sealing element 25. This recess 27 is widened at its bottom. An activation rod 28, with its one end possessing a radial flange 29, is accommodated form-fit in the recess 27. The other end of the activation rod 28 extends through a penetrative opening 30 out of the housing top 2 and carries an activation head 33. The longitudinal axis 21 of the activation rod 28 coincides with the longitudinal axis 22 of the opening 14.

Within the housing top 2 is placed a helical spring 34, which coaxially encloses the activation rod 28 at a separative distance. The spring 34 abuts the housing top 2 on one end, and on the other end, anchors itself on a centering flange 35 which radially projects from the circumferential surface of the activation rod 28. The sealing element 25 is thereby held in its closed or idle position. The centering flange 35 possesses a radially tapering, centering section 36 which tapers toward the activation head 33 and fixes the helical spring in its radial position.

For the activation of the valve shown in FIG. 1, the activation head 33 and connected activation rod 28 are displaced. For instance, activation rod 28 is displaced in the direction of the double arrow 37 and the sealing element 25 and in particular the sealing surface 26 tilt away from the valve seat 16 in the direction of the arrow 38. The thin-walled area 24 of the membrane 17 acts, in this procedure, as a film-hinge and assures the mobility of the sealing element 25. The sealing element 25 can, however, also be lifted from the valve seat 16, if the activation rod 28 is displaced in the axial direction 31. The connection passage 9, which, for instance, is connected with a source of compressed air, then stands in fluid communication with the valve chamber 23 and the flow passage 10. If the flow passage 10, for instance, is connected in turn with an air bag of a vehicle seat(not shown), then this air bag can be inflated with air. For the deflating of the air pressure, a second valve of the described kind would be required.

A plurality of the above-described valves in accord with the invention can be constructed as shown in FIGS. 2–8 and FIG. 10. With such a valve arrangement, optionally many valves in accord with FIG. 1 could be combined. In the following example embodiment, a valve arrangement will be described, which possesses three connection passages and four flow diversions. In FIG. 2 to 8 and in FIG. 10 the same or similar components are provided with the same reference numbers except where a "1" or a "10" is prefixed thereto.

Figure 2:
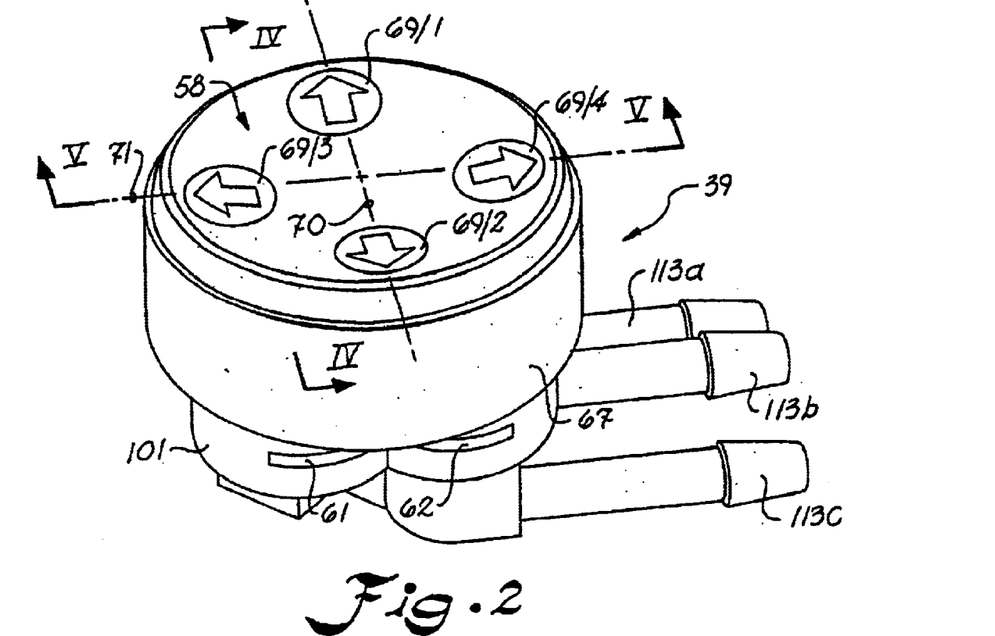

The perspective overview in FIG. 2, which presents a valve arrangement 39, exhibits a valve body 101 with a total of three connection passages 109, 110, 111. The connection passages communicate to the outside of the valve body 101 through fittings 113a, 113b, 113c. The fitting 113b is for connection to a compressed air source, and the fittings 113a and 113c are provided respectively for connection, for instance, an air bag at a vehicle seat position. The valve body 101 possesses a smooth, combined surface 103, in which a total of 7 openings penetrate (see FIG. 3). The second connection passage 110 branches itself in the valve body 101, wherein each branch terminates in a 110 opening 40a, 40b in the surface 103.

The third connection passage 111 likewise branches into double channels, wherein each branch communicates with a 111 opening 43a, 43b in the surface 103. The openings 40a, 40b, 43a, 43b are seen in the top view FIG. 3 disposed opposite each other toward a housing ring 67. The first interconnection passages 44a, 44b in the valve body 101 which serve, respectively, one opening pair 40a/40b and 43a/43b, run accordingly at a right angle to one another. On an imaginary connection line between the openings 40a, 43b, midway therebetween, the connection passage 109 terminates into middle opening 45 which penetrates the surface 103. Additional first and second openings 46, 47 are made available to the respective openings 40b and 43a. These openings are open to the environment by means of an atmospheric passage 48 (FIG. 4, 7) and in turn body openings 61, 62 in the valve body 101 (FIG. 2). On the full surface 103 lies a full membrane 117 with a rim gasket 118. The rim gasket 118, as is seen in FIG. 8, possesses an outline shape, as if four imaginary circles proximal areas extend slightly into one another. The said four imaginary circles (again FIG. 8) are so disposed together that their centers form the corners of a square. The rim gasket 118, then, exhibits a corresponding outline form, which is similar to a four-leaf clover. The full membrane 117 is combined out of four individual membranes 117a to 117d set together.

Figure 3:
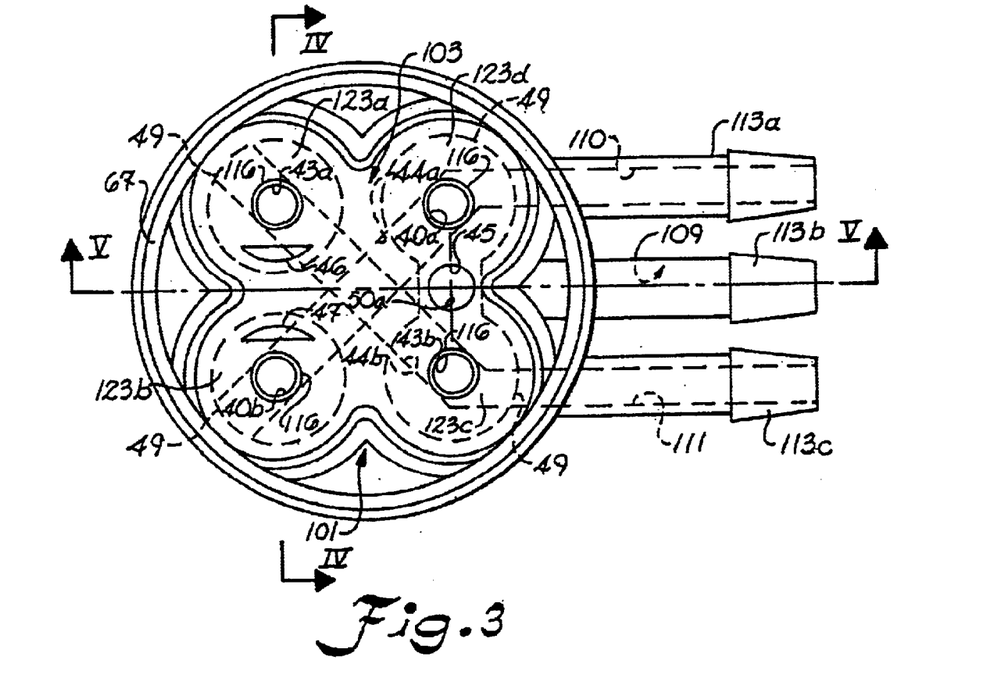
Figure 4:
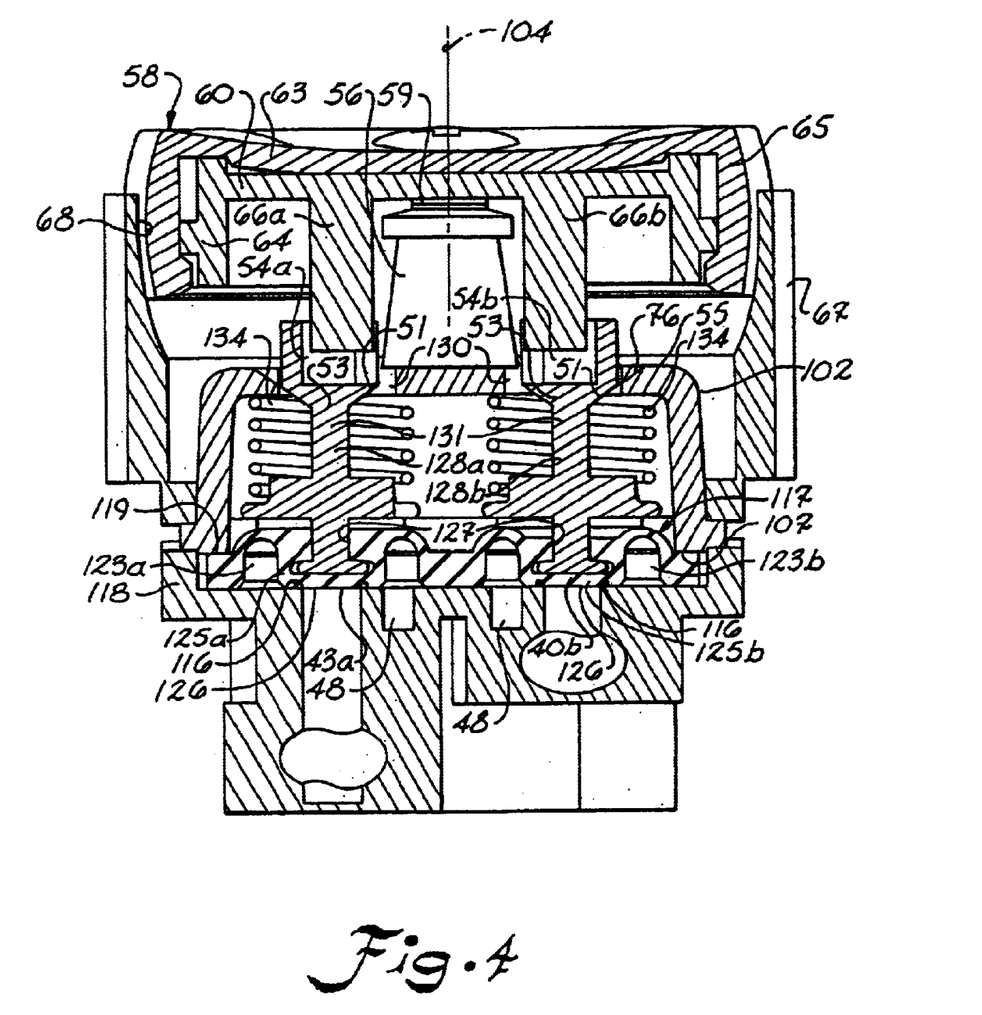
Figure 5:
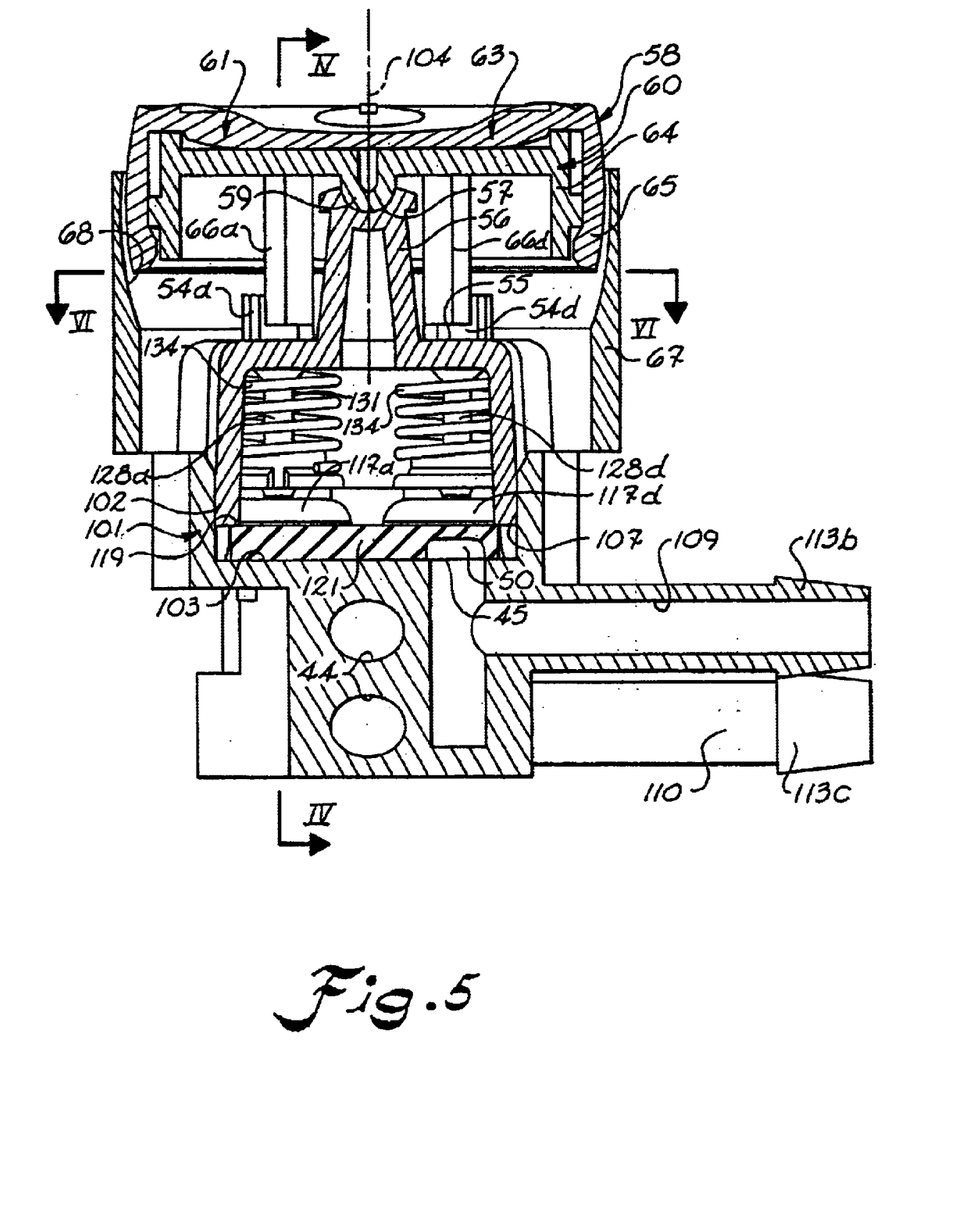

The rim gaskets 118 of the individual membranes blend in centrally, forming a sealing middle area 118a, which likewise is sealingly superimposed on the full surface 103. During the assembly, the full membrane 117 lies upon the full surface 103 and four valve chambers 123a to 123d are formed. The dividing line between the full membrane 117 and the surface 103 is depicted in FIG. 3 respectively by a dash-dot line 49. This shows the fact that the opening pairs 43a/46 and 40b/47 are placed respectively in their own valve chamber 123a and 123b. The openings 43a and 40b are, in the circular top view of FIG. 3, seen as circular and are encompassed by a valve seat 116. The valve seats 116 coact respectively with a sealing element 125a, b, (FIG. 4, 7). The openings 40a and 43b are likewise arranged in their own valve chambers 123d and 123c.

The sealing area 121 extends between the openings 40a, 43band exhibits a second interconnection passage 50 (FIG. 5) on its underside. The passage 50 extends in the direction of the connection line 51a between the openings 40a and 43b (FIG. 3). This interconnection line 50a binds together the two valve chambers 123d and 123c with one another and simultaneously with the connection passage 109.

As is also evident in the foregoing embodiment, in the upper side of the individual membranes 117a–d, a recess 127 is available, in which a respective activation rod 128a–d lies, with its one end secured therein in a form-fit manner (FIG. 8). With its other end, the activation rod 128a–d, respectively, penetrates a through opening 130 of the housing top 102 (FIG. 4). The rim gasket 118 of the full membrane 117 lies with its upper side 119 on the facing 107 of the housing top 102 and is pressed against the surface 103. If necessary in the central area of 118a, the membrane 117, can be pressed against the surface 103 by means of a (not shown) hold-down arrangement on the underside of the housing top 102. The housing top 102 possesses, in the top view, an outline contour corresponding to the outline shape of the membrane. The activation rods 128a–d and the helical springs 134 which coaxially enclose them are, respectively, each in one of the four-leaf clover bosses of the housing top 102. The through openings 130 in the upper side of the housing top 102 are, essentially, of square cross-section and are so placed that their center points lie upon the corners of an imaginary square. The center points of the through openings 130 align themselves in this arrangement, with the centerlines of the valve chambers 123a–d. The end of the activation rod 128 proximal to the through opening 130 is expanded to a plate 53. This is seen in top view as somewhat square and possesses edges 51 slanted toward the circumferential surface 131 of the activation rod 128a–d. The through opening 130 and the plates 53 are so aligned to one another that they have the diagonals 75 in common. These two diagonals 75 also intersect the longitudinal central axis of the valve arrangement 39 (see FIG. 6). From the upper side of the plates 53 and placed in the area of the through opening 130 stands, respectively, a structural angle bar 54a–d extending in the direction of the longitudinal central axis 104.

The two legs of the angle bar 54a–d form, respectively, a right angle opening toward the longitudinal central axis 104. As shown clearly in FIG. 6, the angle bars 54a–d run parallel to the neighboring sides of the through openings 130. Central to the upper side 55 of the housing top 102 stands, somewhat at right angles in FIG. 5, a carrier post 56, which carries a ball socket 57 depression on its free end. In this ball pan lies, as it would be seen in a top view, a somewhat circular toggle 58 with a hemispherical shaped bearing pin 59 centrally protruding from its underside. This toggle 58 is composed of two combined parts, namely an inner part 60 and an outer part 63. Both parts are essentially circular disks, from the circumferential rims of which first apron 64 and second apron 65 extend at right angles in a direction toward the valve body 101. The outer part 63 is, with its second apron 65, force fit on the inner part 60. From the bearing carrying pin 59 side of the inner part 60, protrude four lever arms 66a–d, which are designed as angle bars. These extend in a direction parallel to the central axis 104. The lever arms 66a–d overlap in an axial direction the aforesaid angle bars 54a–d. The legs of the lever arms 66a–d run parallel to the corresponding legs of the angle bars 54a–d and so enclose an angle opening to the central, longitudinal axis 104.

The toggle 58 is encircled by the housing ring 67, which is shaped onto the outside of the housing top 102. The housing ring 67 possesses an upper zone, the inner wall structure 68 of which is curved and in part has a spherical surface. The outside of the second apron 65 of the toggle 58 is complementarily rounded off and is guided by the inner wall 68 upon a pressing of the toggle 58. The toggle 58 has, because of its spherical linkage bearing, practically an unlimited number of tilting planes. On the upper side of the toggle are provided, however, four selection symbols 69/1–4 (see FIG. 2). If the toggle 58 is pressed on one of the four selection symbols 69, then the valve arrangement is brought into a predetermined flow direction state corresponding to the selected symbol 69 direction. The toggle is thus essentially pivotable about two tilting axes 70, 71 which are perpendicular to one another (see FIG. 2,6).

In the following, the functional manner of the valve arrangement in accord with FIGS. 2 to 8 will be explained in greater detail. For purposes of this explanation, the assumption is made that the connection fitting 113b, with its connection passage 109, is connected with a source of compressed air. Also assumed is that the connection fittings 113a and 113c, with their corresponding connection passages 110, 111, are respectively communicating with an air bag of a vehicle (not shown). First, the flow switching is described for when the first tilting axis 70 is active, that is, when the toggle 58 has been activated on the flow selection symbol 69/1 or 69/2.

Figure 6:
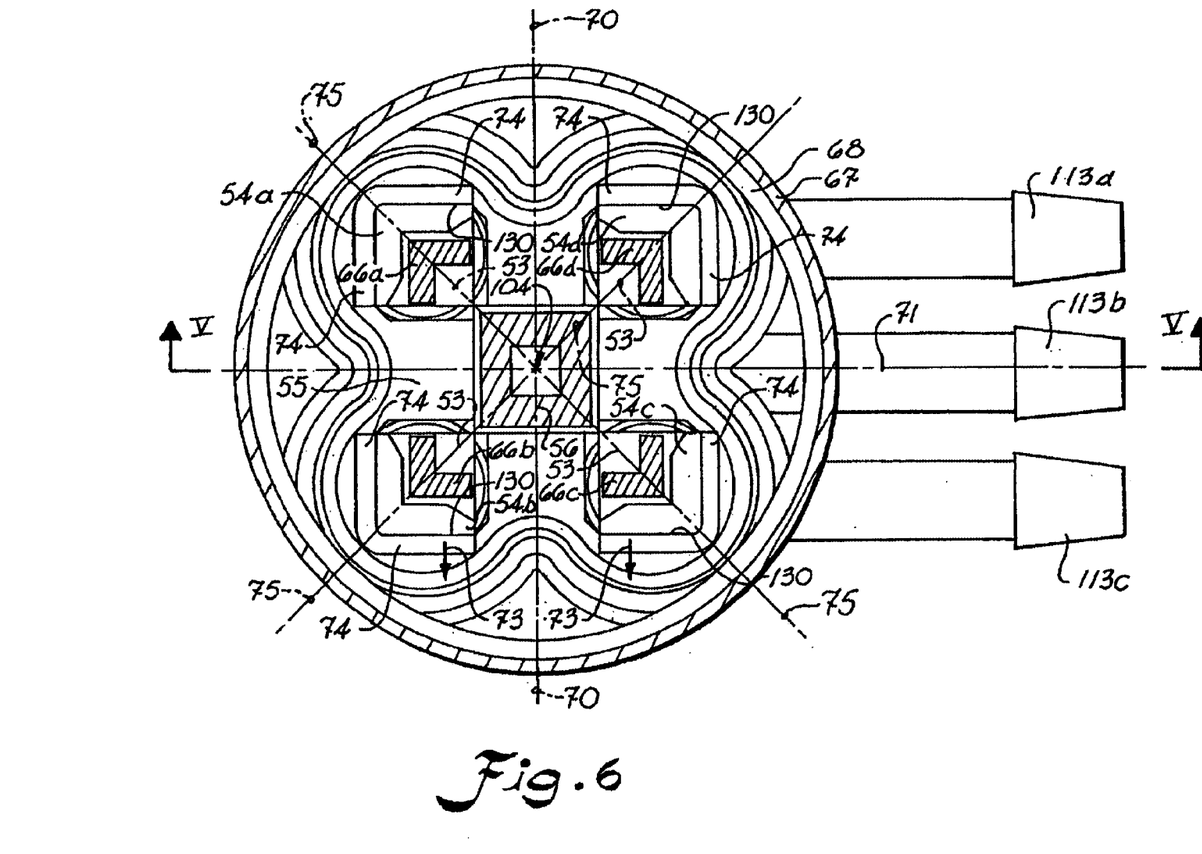

In the non-pressed condition, the valve arrangement assumes its exit flow state, which is depicted in FIGS. 4 and 6. The lever arms 66 of the toggle 58 extend parallel to the central, longitudinal axis 104 in which position they do not exert force on the activation rods 128a, b. All sealing elements 125 lie with their sealing surfaces 126 on the valve seats 116 encircling the openings 40 and 43. The openings 40 and 43 are thus shut.

Figure 7:
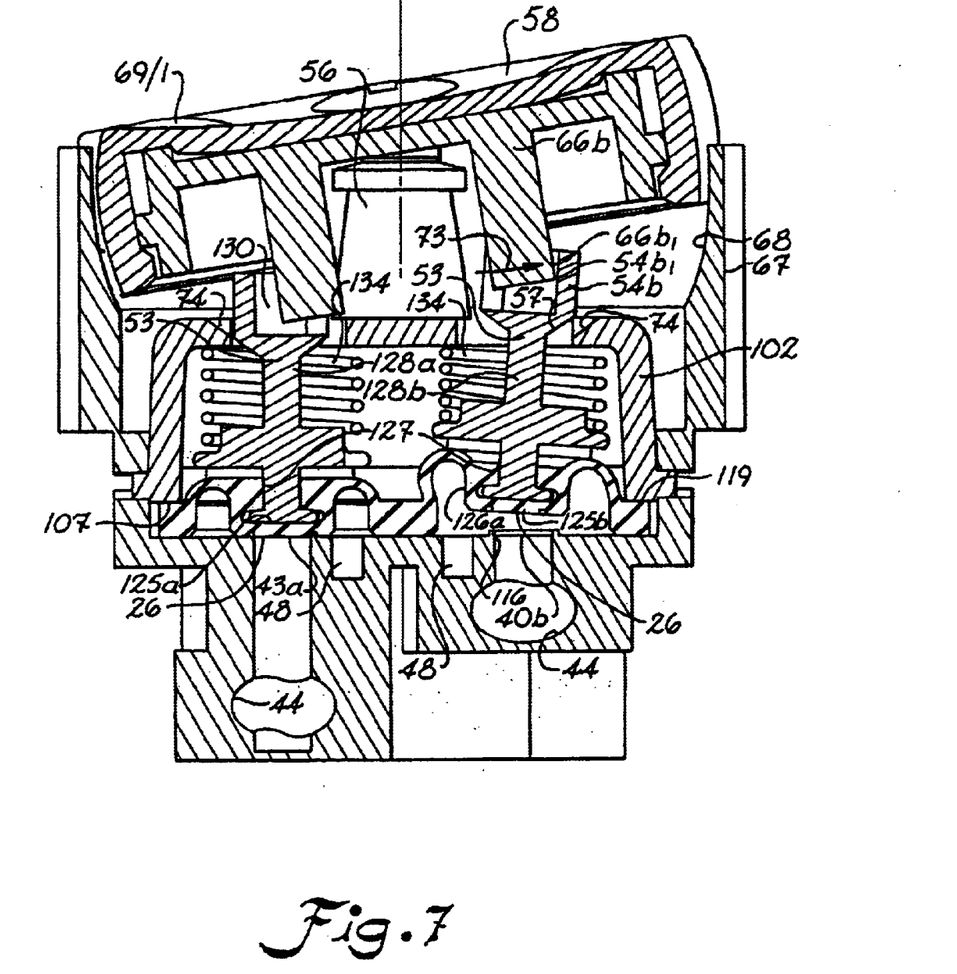
Figure 8:
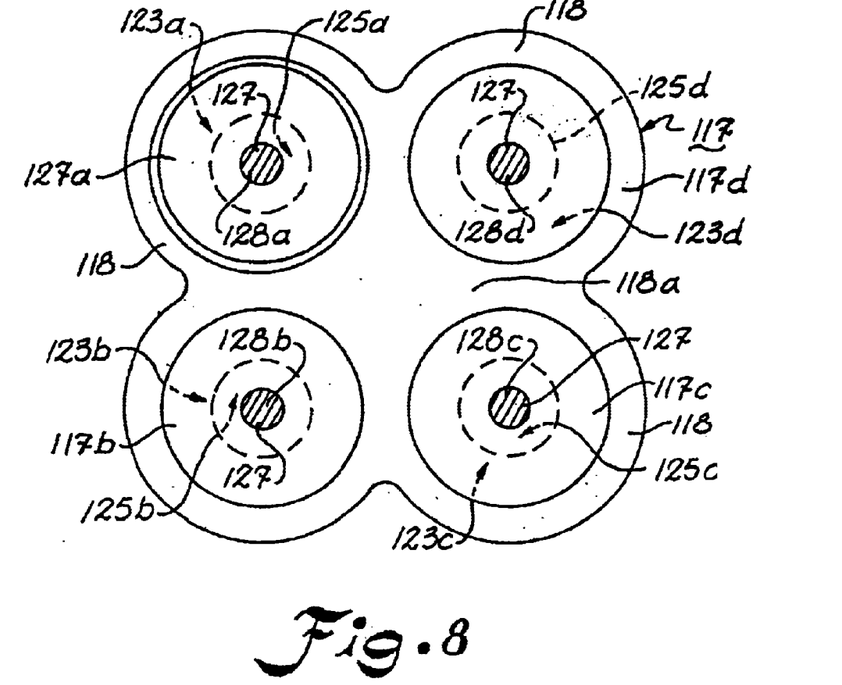

If the toggle is pressed downward on the activation symbol 69/1, for example, the lever arms 66b, 66c are deflected in the direction of the arrows 73 in FIGS. 6 and 7. The corresponding leg 66b, 66c, of the respective lever arm 66b, 66c, now strikes on the leg 54b, 54c, of the angle bar 54b or 54c, respectively, which is parallel to it. In accord with this, as is shown in FIG. 7, the activation rod 128b and also the activation rod 128c (FIG. 8) are deflected and the sealing elements 125b, c, are lifted from the valve seats 116 of the opening 40b and 43b. This has the effect that the opening 40b, which communicates with passageway 110, is now open to the atmospheric opening 47. Thus an air bag connected with the passageway 110 is deflated.

Figure 9A:
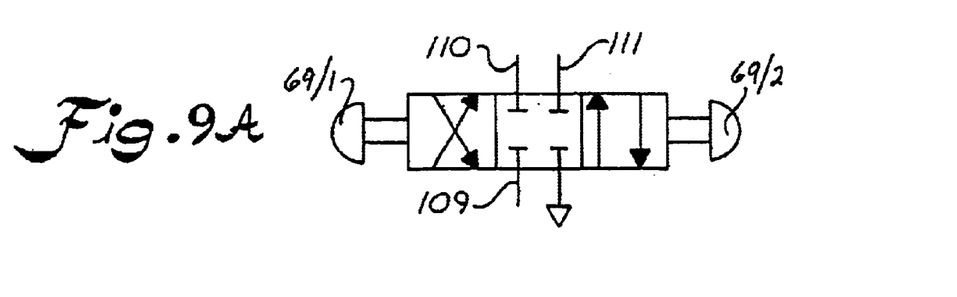

The opening 43b, on the other hand, upon the lifting of valve element 125b away from the interconnection passage 50 (see FIG. 5) is brought into open connection with the middle opening 45 which communicates with the passageway 109. By means of the described open path, compressed air has access to the passageway 111. Accordingly, an air bag connected to passageway 111 is inflated. The described flow selection is depicted in the schematic valve diagram 9A.

Figure 9B:
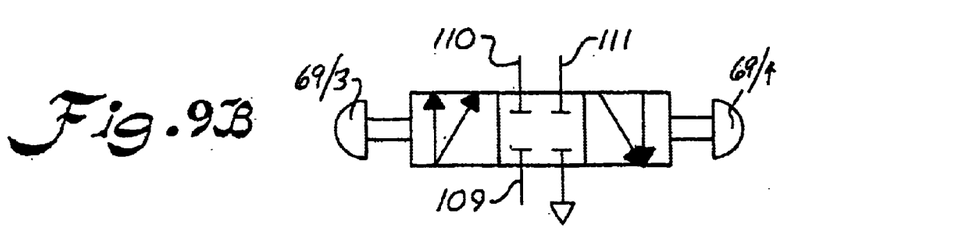

If the symbol 69/2 is depressed, then the sealing elements 125a, d are lifted from the openings 43a and 40a. In the valve setting shown in FIG. 9B, the first air bag is supplied with compressed air by means of the opening 45, the interconnection 50, the opening 40a and the connection passage 110. The second air bag, on the other hand, deflates through the passage 111, the opening 43a and the opening 46 to the atmosphere.

The above described, first air-flow plan (symbol 69/1) is schematically shown in FIG. 7. This illustration shows that the lever arm 66b impinges against the angle bar 54b, whereby the activation rod 128b is displaced transversely from its longitudinal position and the sealing element 125b is tilted away from the valve seat 116 of the opening 40b. At the least, at the end of the tilting movement, the plate 53, with its inclined edging, is displaced onto a correspondingly slanted incline 74, the incline 74 being incised into the rim of the through opening 130 to coact with the plate 53. In this way, the sealing element 125 is lifted in an axial direction 126a from valve seat 116. The tilt movement of the sealing element 125b is thus superimposed on a movement in the axial direction 126a. At the beginning of the tilt movement, the available air passage opening between the valve seat 116 and the sealing surface 26 of the sealing element 125b is still restricted. When, on the other hand, the plate 53 is pressed against the incline 74, then the available air passage reaches its greatest opening. The flowing quantity of air through the air flow opening 40 permits a certain degree of control. By a more or less strong tilting of the toggle 58, the rapidity of the filling of the air bag can be regulated.

The tilting axis 71 is active when the toggle 58 is activated by pressure on the symbols 69/3 or 69/4. If the toggle 58 is pressed downward on the symbol 69/3, then the sealing elements 125c and 125d on the valve seats 116 of the respective openings 40a and 40b are tilt-lifted away. By means of the interconnection passage 50, then, both openings 40a, 43b, and therefore the connection passages 110, 111, are brought into communication with the pressure connection passage 109. Both air bags are thus inflated with air (see FIG. 9B).

If the toggle 58 is pressed downward on symbol 69/4, then the sealing elements 125a and 125b free the openings 43a and 40b. The air bags communicating with the connection openings 110 and 111 can then deflate to the atmosphere through the openings 46 and 47 (see FIG. 9B).

Figure 10:
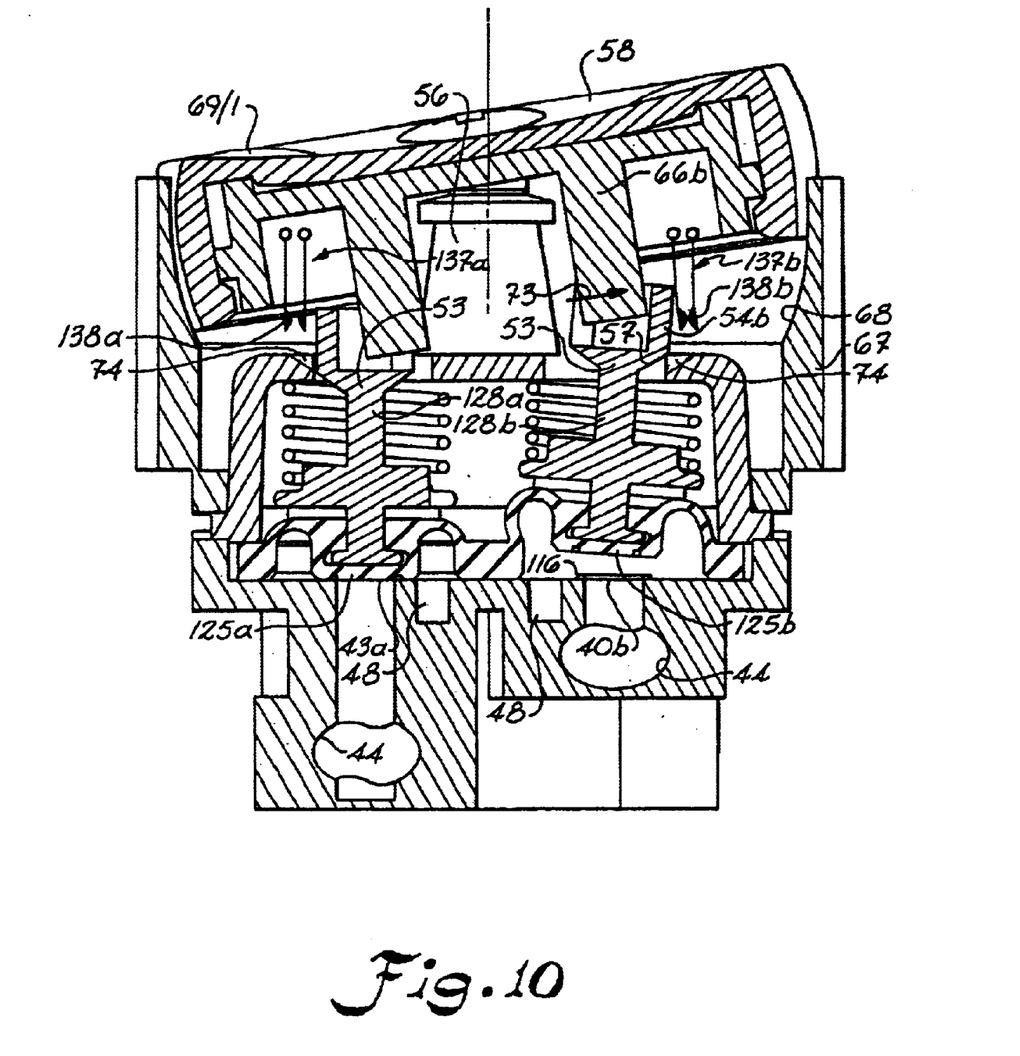

FIG. 10 shows a multiport valve with an additional electrical switching function. In the area of the toggle 58 are placed two electrical switches 137a, 137b, the switching contacts 138a, 138b of which are activated by the angle bars 54. With the tilting of the toggle 58, simultaneous pneumatic and electrical switching functions become possible. In this way, for instance, an electrical pneumatic pump can be switched on in order to inflate the air bag chosen by the toggle 58 with compressed air. An additional switching function can also be provided for the valve in accord with FIG. 1.

It will be apparent to those skilled in the art that various modifications and variations can be made in the present invention departing from the scope and spirit of the invention. For example, specific shapes of various elements of the illustrated embodiments may be altered to suit particular connector or receptacle applications. It is intended that the present invention include such modifications and variations as come within the scope of the appended claims and their equivalents.

What is claimed is:

1. A pneumatic multiport valve comprising:
   a valve body having a first and a second connection passage therein, the first connection passage configured for connection to a source of a compressed air and the second connection passage configured for connection to an inflatable item;
   a surface disposed on the valve body, the surface having a first opening therethrough in communication with the first connection passage, a second opening therethrough in communication with the second connection passage, and a third opening therethrough in communication with the second connection passage, and a fourth opening therethrough in communication with an atmosphere;
   a flexible membrane secured to the surface so as to sealingly encompass the first, second, third, and fourth openings;
   a first valve chamber disposed between the surface and the membrane in communication with the first opening and in selective communication with the second opening;
   a second valve chamber disposed between the surface and the membrane in selective communication with the third opening and in communication with the fourth opening;

two sealing elements disposed on the membrane defining sealing surfaces for selectively sealing the second and third openings from the first and second valve chambers, respectively; and two activation elements, each for activating a respective sealing element such that the respective sealing element can be selectively engaged or disengaged from a respective one of the second and third openings to place the second connection passage in communication with the first or second valve chamber to thereby inflate or deflate the inflatable item.

2. The multiport valve of claim 1, wherein the first connection passage is configured to communicate the compressed air to the first valve chamber.

3. The multiport valve of claim 1, further comprising a third connection passage configured for connection to a second inflatable item.

4. The multiport valve of claim 3, wherein the surface has a fifth opening therethrough in communication with the third connection passage, the first valve chamber in selective communication with the fifth opening.

5. The multiport valve of claim 4, further comprising a third sealing element disposed on the membrane and defining a third sealing surface for selectively sealing the fifth opening from the first valve chamber.

6. The multiport valve of claim 5, further comprising a third activation element for activating the third sealing element such that the third sealing element can be selectively engaged or disengaged from the fifth opening to place the third connection passage in communication with the first valve chamber to thereby inflate the second inflatable item.

7. The multiport valve of claim 1, wherein the two sealing elements and the flexible membrane are unitarily constructed.

8. The multiport valve of claim 1, wherein the flexible membrane further comprises at least two separate membranes separately disposed about the first and second valve chambers.

9. The multiport valve of claim 1, further comprising at least one electrical switch disposed proximate at least one of the two activation elements such that the at least one of the two activation elements electrically activates the multiport valve.

10. The multiport valve of claim 1, wherein the surface has a sixth and a seventh opening therethrough, the sixth opening in communication with the third connection passage, the seventh opening in communication with the atmosphere.

11. The multiport valve of claim 10, further comprising a third valve chamber disposed between the surface and the membrane, the third valve chamber in selective communication with the sixth opening and in communication with the seventh opening.

12. The multiport valve of claim 11, further comprising a fourth sealing element disposed on the membrane and defining a fourth sealing surface for selectively sealing the sixth opening from the third valve chamber.

13. The multiport valve of claim 12, further comprising a fourth activation element for activating the fourth sealing element such that the fourth sealing element can be selectively engaged or disengaged from the sixth opening to place the third connection passage in communication with the third valve chamber to thereby deflate the second inflatable item.

14. A multiport valve assembly for selectively inflating or deflating two inflatable objects, the multiport valve assembly comprising:

a valve body having a surface transversely disposed about a longitudinal axis of the valve body, the surface defining a first, a second, a third, a fourth, a fifth, a sixth, and a seventh surface opening therethrough, the surface openings configured for passage of a compressed air;

a connection manifold depending from the valve body, the connection manifold having a first connection passage to supply the compressed air to at least one of the surface openings;

a first and a second connection fitting depending from the valve body and each configured for attachment to a respective one of the inflatable objects, the first and second connection fittings respectively defining a first connection passage and a second connection passage, the first and second connection passages in selectable communication with the connection manifold;

a membrane disposed on the surface and defining four sealing elements with at least four sealing surfaces on a side of the membrane in a direction of the surface;

a first valve chamber, a second valve chamber, and a third valve chamber each disposed between the membrane and the surface, the first valve chamber in communication with the first surface opening and in selective communication with the second and fifth surface openings, the second valve chamber in selective communication with the third surface opening and in communication with the fourth opening, the third valve chamber in selective communication with the sixth opening and in communication with the seventh opening, and the at least four sealing surfaces configured for selectively sealing the second and fifth surface openings from the first valve chamber, the third surface opening from the second valve chamber, and the sixth surface opening from the third valve chamber, respectively;

a housing disposed adjacent the valve body, the housing defining four penetration openings therethrough;

a first, a second, a third, and a fourth activation rod for activating a respective one of the four sealing elements, each activation rod disposed through a respective one of the four penetration openings and controllably attached to the membrane such that a respective one of the at least four sealing surfaces can be selectively engaged or disengaged from a respective one of the surface openings to place the second or third connection passage in communication with the first, second or third valve chamber to thereby inflate or deflate the inflatable item; and a toggle element disposed proximate the housing such that the housing is between the toggle element and the valve body and the activation rods are pivotably adjacent the toggle element, the toggle element configured to toggle the activation rods such that at least one of the sealing elements is tilted away from a respective one of the surface openings to inflate or deflate the inflatable objects when the toggle element is toggled.

15. The multiport valve assembly of claim 14, wherein the inflatable objects are air bags.

16. The multiport valve assembly of claim 14, wherein the membrane is substantially square in shape.

17. The multiport valve assembly of claim 16, wherein the membrane is disposed about the three valve chambers such that the second, third, fifth, and sixth surface openings are each disposed proximate a corner of the square shaped membrane.

18. The multiport valve assembly of claim 14, wherein each of the four activation rods define a chamfered edge and further comprising a bevel disposed about each of the four penetration openings, a respective one of the chamfered edges cooperable with a respective one of the bevels such that a motion of the toggle element moves a respective one of the four sealing elements.

19. The multiport valve assembly of claim 14, further comprising spring means for urging the first, second, third, and fourth activation rods in a closed direction to seal the at least four sealing surfaces of the four sealing elements about the second, third, fifth, and sixth surface openings.

20. The multiport valve assembly of claim 19, wherein the spring means for urging is a plurality of springs, each spring disposed about a respective one of the four activation rods in an interior of the housing.

21. The multiport valve assembly of claim 14, further comprising an electrical switch activatable by the toggle element, the activated electrical switch configured to activate a flow of the compressed air to at least one of the inflatable objects.

* * * * *